United States Patent
Israelian et al.

(10) Patent No.: US 9,525,912 B1
(45) Date of Patent: Dec. 20, 2016

(54) SYSTEMS AND METHODS FOR SELECTIVELY TRIGGERING A BIOMETRIC INSTRUMENT TO TAKE MEASUREMENTS RELEVANT TO PRESENTLY CONSUMED MEDIA

(71) Applicant: Rovi Guides, Inc., Santa Clara, CA (US)

(72) Inventors: Vazrik Israelian, Glendale, CA (US); Walter R. Klappert, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/947,178

(22) Filed: Nov. 20, 2015

(51) Int. Cl.
*H04N 21/84* (2011.01)
*H04N 21/442* (2011.01)
*H04N 21/258* (2011.01)
*H04N 21/45* (2011.01)
*G06F 17/30* (2006.01)

(52) U.S. Cl.
CPC .. *H04N 21/44218* (2013.01); *G06F 17/30424* (2013.01); *G06F 17/30784* (2013.01); *H04N 21/25883* (2013.01); *H04N 21/4532* (2013.01); *H04N 21/84* (2013.01)

(58) Field of Classification Search
CPC .............. H04N 21/44218; H04N 21/25883; H04N 21/4532; H04N 21/84; G06F 17/30424; G06F 17/30784
USPC .......................................................... 725/10
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,185,282 B1* | 2/2007 | Naidoo | A61B 5/0002 348/E7.071 |
| 7,761,892 B2 | 7/2010 | Ellis et al. | |
| 8,046,801 B2 | 10/2011 | Ellis et al. | |
| 8,782,681 B2 | 7/2014 | Lee et al. | |
| 2002/0174430 A1 | 11/2002 | Ellis et al. | |
| 2003/0110499 A1 | 6/2003 | Knudson et al. | |
| 2005/0071865 A1 | 3/2005 | Martins | |
| 2005/0229225 A1* | 10/2005 | Klausberger | G11B 27/034 725/112 |
| 2005/0251827 A1 | 11/2005 | Ellis et al. | |
| 2005/0289582 A1* | 12/2005 | Tavares | G06K 9/00221 725/10 |
| 2010/0153885 A1 | 6/2010 | Yates | |
| 2012/0066704 A1 | 3/2012 | Agevik | |
| 2014/0089954 A1* | 3/2014 | Sampathkumaran | H04N 21/258 725/10 |
| 2014/0223462 A1* | 8/2014 | Aimone | H04N 21/42201 725/10 |

(Continued)

*Primary Examiner* — Nathan Flynn
*Assistant Examiner* — Caroline Somera
(74) *Attorney, Agent, or Firm* — Ropes & Gray LLP

(57) ABSTRACT

Systems and methods are provided herein for selectively triggering biometric measurement from an appropriate biometric instrument of a plurality of biometric instruments to determine biometric responses that are relevant to presently consumed media content. These systems and methods may be used to ensure efficient use of biometric instruments. This efficient use may ensure that energy use is efficiently managed, that noise from irrelevant biometric measurements is avoided, and the like.

20 Claims, 9 Drawing Sheets

(56) References Cited

U.S. PATENT DOCUMENTS

2015/0143392 A1* 5/2015 Silveira-Filho ........ H04H 60/33
725/10
2015/0156529 A1* 6/2015 Peterson ............ G06Q 30/0269
725/12

* cited by examiner

SYSTEMS AND METHODS FOR SELECTIVELY TRIGGERING A BIOMETRIC INSTRUMENT TO TAKE MEASUREMENTS RELEVANT TO PRESENTLY CONSUMED MEDIA

BACKGROUND OF THE INVENTION

Measurement of biometric data may be useful to process a viewer's reaction to media content. For example, the amount a viewer's heart rate increases during a thrilling scene of a movie may reflect how thrilled the viewer was caused to be by the scene. However, some biometric measurements may not be useful in processing a viewer's reaction to media content. As an example, during the same thrilling scene of the movie, measuring how much a viewer is smiling or frowning will not reflect how thrilled a viewer is. Accordingly, such biometric measurements may act as noise when control circuitry seeks to determine, based on a totality of biometric measurements, a viewer's reaction to a given portion of media content. Moreover, it is inefficient to capture biometric measurements that are not helpful in processing a viewer's reaction to a given portion of media content.

SUMMARY

Systems and methods are provided herein for selectively triggering biometric measurement from an appropriate biometric instrument of a plurality of biometric instruments to determine biometric responses that are relevant to presently consumed media content. These systems and methods may be used to ensure efficient use of biometric instruments. This efficient use may ensure that energy use is efficiently managed, that noise from irrelevant biometric measurements is avoided, and the like.

In some aspects of the disclosure, control circuitry may detect metadata of media content that a user is consuming that is indicative of a need for biometric measurement during a period of time. For example, control circuitry may detect metadata that is embedded in the media content itself, or received with attendant information (e.g., through information of a vertical blanking interval signal, through the Internet, etc.). Control circuitry may detect an express instruction for biometric measurement to be taken. Alternatively, control circuitry may detect metadata indicative of usefulness of a biometric measurement, such as the fact that a funny scene is about to occur, and that it would be beneficial to measure how funny an audience found the scene to be.

In some embodiments, control circuitry may determine a type corresponding to the metadata. As described above, the type may be that a scene that is intended to be funny is beginning. Other types may be genre, scene types, the fact that a particular character or actor is appearing, and the like. The type may be specified by the metadata. Alternatively, the type may be determined based on information in the metadata (e.g., by comparing that information to information of a database and determining based on the comparison what the type is).

In some embodiments, control circuitry may identify a plurality of biometric instruments that are in the vicinity of the user. For example, control circuitry may cause a "hello" signal to be transmitted to nearby devices (e.g., over WiFi, Bluetooth, infrared, R/F, etc.) and may identify nearby devices based on detecting a confirmation from nearby devices in response to the "hello" signal. As another example, control circuitry may have a register of connected devices, and may consult the register to identify the plurality of biometric instruments that are in the vicinity of the user.

In some embodiments, control circuitry may determine, based on the type, a biometric instrument of the plurality of biometric instruments whose measurements would be sufficient for satisfying the need for biometric measurement. For example, control circuitry may determine that the type indicates that an action scene is being played, and may responsively determine that a heart rate monitor would be sufficient for satisfying the need for biometric measurement because it would indicate how thrilled a person was by the action scene.

In some embodiments, control circuitry may command the biometric instrument to measure a biometric response of the user in relation to the media content during the period of time. Following from the action scene example, control circuitry may command a heart rate monitor to take heart rate measurements during the period of time.

In some embodiments, control circuitry may refrain from commanding biometric instruments of the plurality of biometric instruments that would not be sufficient for satisfying the need for biometric measurement to measure the biometric response of the user in relation to the media content during the period of time. For example, following from the action scene example, control circuitry may identify that a facial recognition monitor would not be useful in determining whether a user is thrilled by an action scene, and may refrain from commanding the facial recognition monitor to take measurements.

Similarly, control circuitry may identify any biometric instruments of the plurality of biometric instruments that would not be sufficient for satisfying the need for biometric measurement that are measuring the biometric response of the user in relation to the media content during the period of time, and, in response to the identifying of the any of the biometric instruments that would not be sufficient for satisfying the need for biometric measurement, commanding the any biometric instruments of the plurality of biometric instruments that would not be sufficient for satisfying the need for biometric measurement to cease measuring the biometric response of the user. For example, following from the example above, control circuitry may command a facial recognition monitor that is taking biometric measurements to cease taking the biometric measurements if control circuitry determines that those measurements are not needed to determine how thrilled a user is.

In some embodiments, control circuitry may, when detecting the metadata of the media content that the user is consuming that is indicative of the need for biometric measurement during the period of time, receive the metadata corresponding to the media content, parse the metadata for a trigger, and when a trigger is found during the parsing, determine that the metadata is indicative of the need for biometric measurement. For example, control circuitry may receive metadata by way of a VBI channel, detect an express command to take biometric measurements when parsing the metadata, which forms a trigger, and initiate measurements based on that trigger.

In some embodiments, control circuitry may determine, based on the trigger, an indication of both the type and the period of time, wherein the type varies both before and after the period of time, and wherein the period of time corresponds to a discrete portion of the media content. For example, control circuitry may detect metadata that states that an action scene is beginning at time 42:58 and ending at time 51:20. This metadata may form a trigger that causes a heart rate monitor to begin measuring heart rate from time 42:58 to time 51:20. The scene preceding time 42:58, and the scene after time 51:20, may be scenes that are not action scenes.

In some embodiments, control circuitry may command, at the end of the period of time, the biometric instrument to discontinue measuring the biometric response of the user. For example, following the example from above, at time 51:20, control circuitry may instruct the heart rate monitor to cease measuring the user's heart rate.

In some embodiments, when control circuitry is determining, based on the type, the biometric instrument of the plurality of biometric instruments whose measurements would be sufficient for satisfying the need for biometric measurement, control circuitry may determine, based on the type, an expected emotional response that the user will have when the user consumes the media content. For example, if control circuitry determines, based on metadata, that a funny scene is about to occur, control circuitry may determine that laughter is an expected emotional response. Control circuitry may then determine, of the plurality of biometric instruments, which biometric instruments are designed to provide measurements of the expected emotional response. For example, control circuitry may determine that a microphone and/or a facial recognition tool may be useful to provide measurements relating to laughter.

In some embodiments, when control circuitry is determining, based on the type, the expected emotional response, control circuitry may access a database, identify listings of the database that correspond to the type, and determine, from data of the listings of the database that correspond to the type, the expected emotional response. For example, control circuitry may determine, based on a scene corresponding to the type "action," that "thrilled" is the expected emotional response through these database mechanisms.

In some embodiments, when control circuitry is determining, of the plurality of biometric instruments, which biometric instruments are designed to provide measurements of the expected emotional response, control circuitry may access a database, identify listings of the database that correspond to each of the plurality of biometric instruments, and determine, from data of the listings of the database that correspond to each of the plurality of biometric instruments, whether a given biometric instrument of the plurality of biometric instruments corresponds to a listing that reflects the expected emotional response. For example, control circuitry may determine, for an action scene, that a heart rate monitor is designed to provide measurements of how thrilled one is by accessing a database in this manner which reflects a correlation between heart rate and how thrilled a user is.

In some embodiments, control circuitry may determine the period of time by identifying the media content, identifying a present elapsed time, accessing a database, comparing the present elapsed time to entries of the database, determining, based on the comparison, a beginning and ending time of a scene corresponding to the present elapsed time, and defining the period of time to be the period of time between the beginning time and the ending time. As an example, a database may correspond a present elapsed time to metadata relating to a scene (e.g., start/end time, type, etc.), and this information may be learned through these database access mechanisms.

In some embodiments, control circuitry may detect metadata of media content comprising a trigger for biometric measurement. Control circuitry may then determine a type corresponding to the metadata, and may then identify a plurality of biometric instruments that are in the vicinity of the user. Control circuitry may determine, based on the type, a biometric instrument of the plurality of biometric instruments that is suitable for performing the biometric measurement, and may command the biometric instrument to measure a biometric response of the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
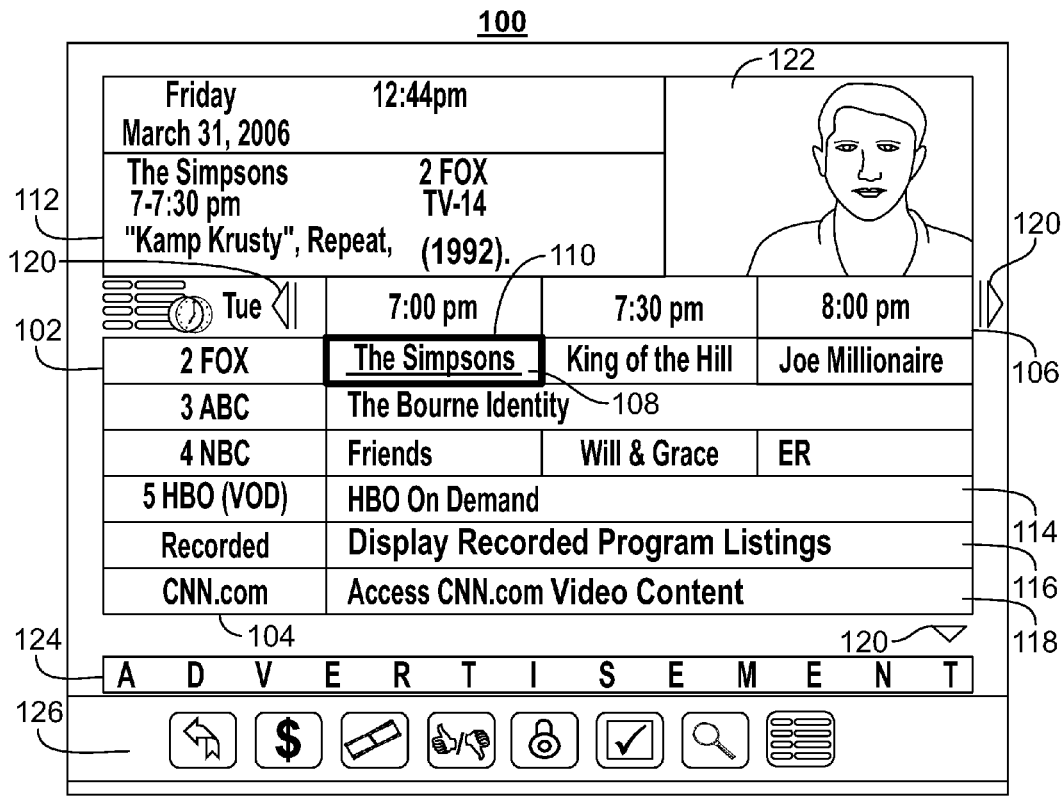
FIG. 1 shows an illustrative embodiment of a display screen that may be used to provide media guidance application listings and other media guidance information, in accordance with some embodiments of the disclosure.

Systems and methods are provided herein for selectively triggering biometric measurement from an appropriate biometric instrument of a plurality of biometric instruments to determine biometric responses that are relevant to presently consumed media content. These systems and methods may be used to ensure efficient use of biometric instruments. This efficient use may ensure that energy use is efficiently managed, that noise from irrelevant biometric measurements is avoided, and the like.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
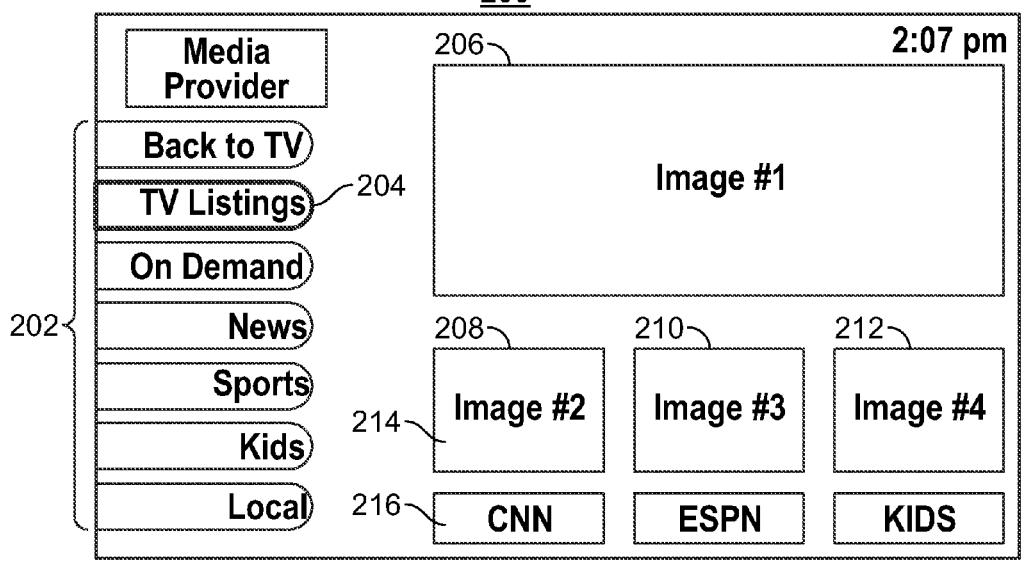
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
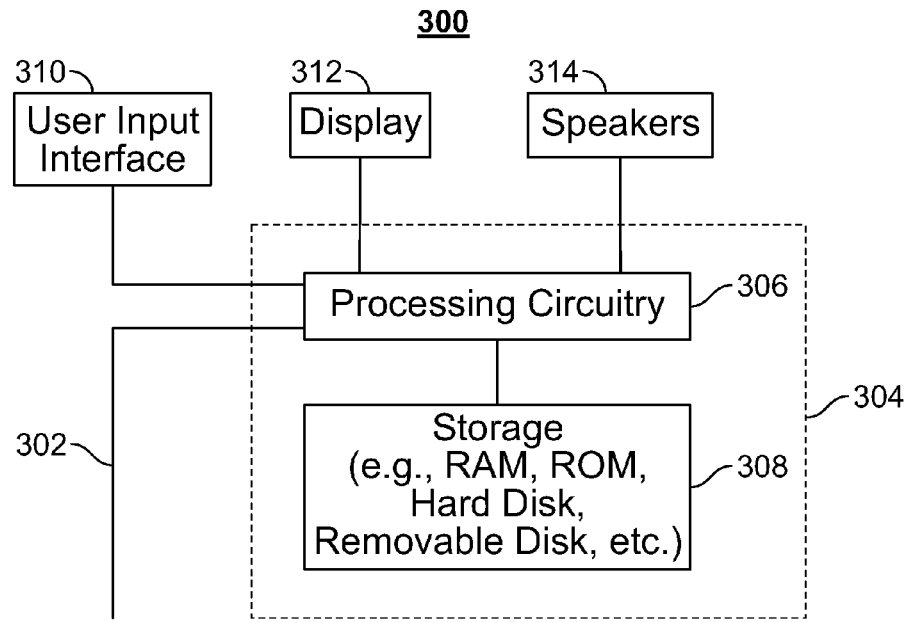
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
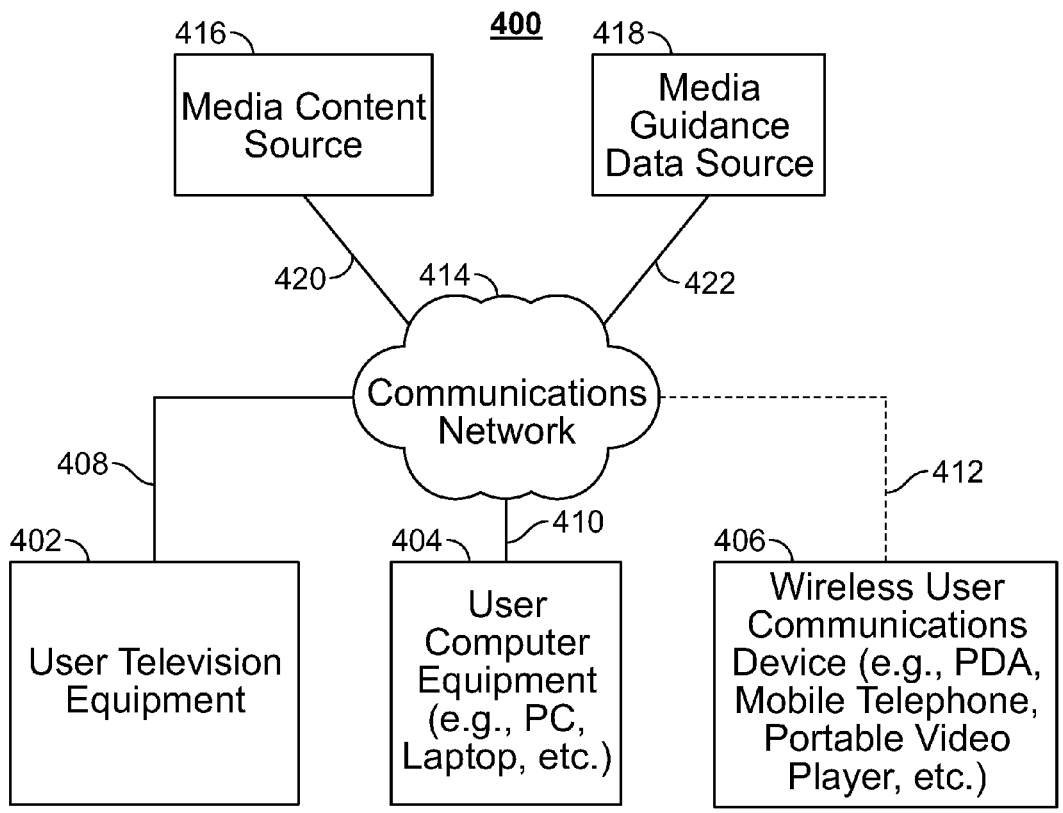
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

Figure 5:
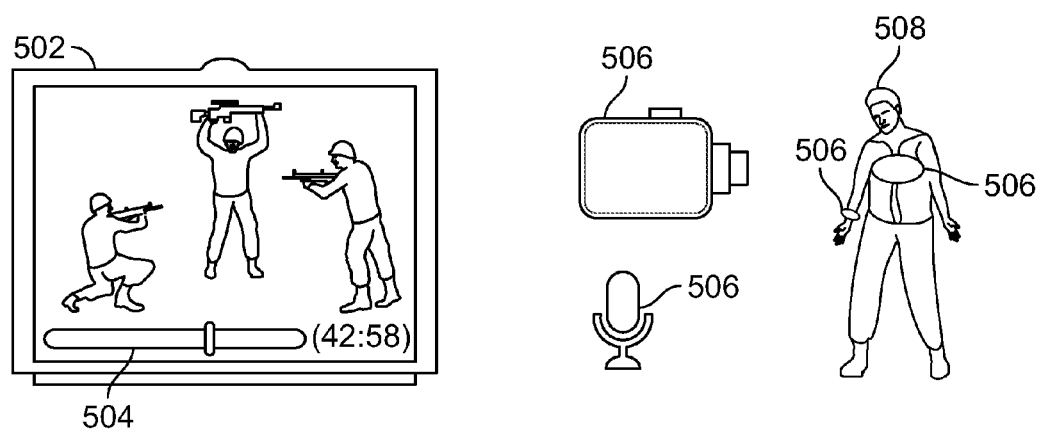
FIG. 5 depicts a user equipment configured to trigger biometric measurements from any of a plurality of biometric instruments, in accordance with some embodiments of this disclosure.

FIG. 5 depicts a user equipment configured to trigger biometric measurements from any of a plurality of biometric instruments, in accordance with some embodiments of this disclosure. FIG. 5 depicts user equipment 502. User equipment 502 may have any of the described capabilities of user television equipment 402, user computer equipment 404, and wireless user communications device 406. User equipment 502 may display a time bar 504. Time bar 504 may comprise any indication of progress of a media asset generated for display by user equipment 502, such as a start time, an end time, scene indicators and other demarcations, and the like.

FIG. 5 also depicts biometric instruments 506. Biometric instruments 506 may comprise any known biometric instrument that is capable of taking a biometric measurement from user 508. Examples of biometric instruments 506 that are depicted in FIG. 5 include a camera, a microphone, a pulse monitor, and a heart rate monitor. Other biometric instruments are known and contemplated by this disclosure. Biometric instruments 506 may comprise features described with respect to user input interface 310.

In some embodiments, control circuitry (e.g., control circuitry 304) may selectively trigger biometric measurement from an appropriate biometric instrument of a plurality of biometric instruments to determine biometric responses that are relevant to presently consumed media content. For example, if a presently consumed media content comprises an action scene, an expected biometric response may be that a user is thrilled. Control circuitry 304 may measure whether the expected biometric response was met by triggering biometric measurement from a heart rate monitor, as a high heart rate may be indicative of a high level of being thrilled.

In some embodiments, control circuitry 304 may detect metadata of media content that a user 508 is consuming that is indicative of a need for biometric measurement during a period of time. The period of time may correspond to any logical portion of media content. Examples of logical portions of media content include a scene, a period of time in which a given actor is present, a period of time in which characters are in a given location, a period of time in which a given item appears or in which a given service is being rendered, and any other logical portion of media content.

Metadata may be indicative of a need for biometric measurement during the period of time by indicating that the period of time is conducive to biometric measurement. In other words, the period of time may be associated with some portion of media content that is likely to be evocative of a biometric response by user 508. Control circuitry 304 may receive the metadata with the media content (e.g., by way of a VBI signal, or with the metadata embedded in the media content itself). Alternatively, control circuitry 304 may receive the metadata from another source, such as media content source 416 or media guidance data source 418, or from a third party provider such as a company that specializes in biometric analysis.

Control circuitry 304 may detect whether metadata is indicative of a need for biometric measurement in any number of ways. Control circuitry 304 may, for example, detect an express instruction within the metadata to take a biometric measurement during a specified period of time, and may conclude from this express instruction that there is a need for biometric measurement. The express instruction may not include a specified period of time, in which case the specified period of time can be used by comparing information of the express instruction to information of a database, such as media guidance data source 418. As an example, if control circuitry 304 understands an express instruction to detect a measure of user 508's laughter during a funny scene, control circuitry 304 may consult media guidance data source 418 to determine that the funny scene begins at time 43:51 and ends at time 47:20. While the term "period of time" is used herein to describe a starting point having a certain number of minutes and seconds, and a similarly defined ending point, "period of time" may refer to a period of time with a more granular timestamp (e.g., fractions of seconds), or may refer to any other definition of a portion of a media asset, such as an indication of specific frames that define the boundaries of the portion.

In some embodiments, control circuitry 304 may not detect any express instruction in the metadata, but may detect information that is nevertheless indicative of a need for biometric measurement during a period of time. As an example, control circuitry 304 may have access to a register of candidate metadata that, if detected, may be indicative of a need for biometric measurement. The register may be stored local to user equipment 502 (e.g., at storage 308) or remote to user equipment 502 (e.g., at media guidance data source 418). The candidate metadata may indicate that if an action scene is detected, a degree to which one is thrilled should be monitored, or if a funny scene is detected, an amount of laughter should be monitored. Accordingly, when control circuitry 304, for example, detects metadata indicative of an action scene, control circuitry 304 would learn that there is a need for biometric measurement indicative of how much one is thrilled. Control circuitry 304 may learn the duration of time, if not expressly stated within the detected metadata, through database comparison operations described above and below.

In some embodiments, control circuitry 304 may determine a type corresponding to the metadata. For example, control circuitry 304 may determine that the type is expressly stated in the metadata (e.g., "action scene"). As another example, control circuitry 304 may determine the type by consulting a candidate metadata register, such as one described above, to learn that an upcoming scene is an "action" type, or that an upcoming scene includes a particular actor, or is any other type of scene.

In some embodiments, control circuitry 304 may identify a plurality of biometric instruments 506 that are in the vicinity of the user. Control circuitry 304 may perform this identification in any of a variety of manners. As an example, control circuitry 304 may transmit a "hello" signal directed to devices on a local network (e.g., WiFi, Bluetooth, personal area network, local area network, etc.) to discover which devices control circuitry 304 is connected to. Control circuitry 304 may query any devices who respond for their capabilities, and may identify a plurality of those devices to be biometric instruments 506. As another example, control circuitry 304 may learn of biometric instruments 506 by virtue of them connecting to a network. For example, as biometric instruments 506 connect through a given access point, biometric instruments 506 may be identified on a register on a database (which may be stored on storage 306, media guidance data source 418, media content source 416, at the access point, or anywhere else that is accessible to user equipment 502). Control circuitry 304 may access such a register to determine which biometric instruments 506 are in the vicinity of the user.

In some embodiments, control circuitry 304 may determine, based on the type, a biometric instrument of the plurality of biometric instruments whose measurements would be sufficient for satisfying the need for biometric measurement. For example, control circuitry 304 may access a database (e.g., media guidance data source 418) that has entries linking what needs to be measured (e.g., how thrilled a person is, amount of laughter, etc.) to measurement units that correlate to what needs to be measured. For instance, how thrilled a person is may correspond to a person's heart rate or pulse rate, and so the database may have an entry linking "thrilled" to "heart rate." Control circuitry 304 may further access a database (which may be the same database or a different database) that has entries linking type (e.g., "action") to what needs to be measured (e.g., how thrilled one is). Finally, control circuitry 304 may access entries of yet another database that has entries linking biometric instruments' capabilities (e.g., heart rate monitoring, facial expression recognition, rate of breathing monitoring, etc.) to the biometric instruments' identities. Any of these database entries may be found on separate databases, or in one or more merged databases that comprise some or all of the above-described information. In sum, using comparison operations on these database(s) entries, control circuitry 304 may resolve an appropriate biometric instrument for taking biometric measurements.

In some embodiments, control circuitry 304 may command the biometric instrument to measure a biometric response of the user in relation to the media content during the period of time. For example, control circuitry 304 may transmit a request (e.g., over communications network 414) to the identified biometric instrument. As an example, if control circuitry 304 has identified that a comedy scene of a movie is beginning at 43:21 and ending at 45:55, control circuitry 304 may transmit a command to a microphone to monitor vocal output of user 508 during that period of time, which control circuitry 304 may use to resolve an amount of laughter made by user 508.

In some embodiments, control circuitry 304 may ensure that only biometric instruments that are sufficient for satisfying the need for biometric measurement are taking biometric measurements during the period of time. To this end, control circuitry 304 may both refrain from commanding any other biometric instruments to take measurements during the period of time, and may identify any biometric instruments that are taking measurements during the period of time that do not satisfy the need and command them to cease taking biometric measurements during the period of time. In this manner, control circuitry 304 will ensure that energy is conserved, and that irrelevant biometric measurements do not cloud or add noise to relevant measurements.

In some embodiments, control circuitry 304 may detect the metadata of the media content that the user is consuming that is indicative of the need for biometric measurement during the period of time by, after receiving the metadata corresponding to the media content in manners described above and below, parsing the metadata for a trigger. Control circuitry may parse the metadata for a trigger in any manner described above and below, such as determining whether a given portion of metadata comprises an express instruction for biometric measurement, or comparing a given portion of metadata to data of a register to determine whether that metadata should trigger biometric measurement. When a trigger is found during the parsing, control circuitry 304 may determine that the metadata is indicative of the need for biometric measurement.

In some embodiments, control circuitry 304 may determine, based on the trigger, an indication of both the type and the period of time. For example, control circuitry 304 may detect an express indication of the type and period of time. Alternatively, control circuitry 304 may identify a portion of metadata that may be used in a comparison operation against entries of a database to determine a type and/or period of time associated with the trigger. As an example, if the trigger comprises indicia of an action scene, control circuitry may know from an express indication that the type is "action," and may determine the period of time by comparing the indicia of the scene to a database to learn at what time period the scene will appear. The type may vary both before and after the period of time—meaning, for example, that given media content may have a variety of types of sub-content, such as a comedy scene followed by an action scene followed by a dramatic scene. Accordingly, the period of time corresponds to a discrete portion of the media content (e.g., a period a scene is occurring, a period that an actor is present, etc.).

In some embodiments, control circuitry 304 may command, at the end of the period of time, the biometric instrument to discontinue measuring the biometric response of the user. As an example, at the beginning of an action scene, control circuitry 304 may have commanded biometric instrument 506, such as a heart rate monitor, to begin taking biometric measurements. Control circuitry 304 may, at the end of the action scene, command the biometric instrument 506 to cease taking biometric measurements. This may be beneficial to conserve energy, avoid capturing biometric instruments that may create noise in resolving other biometric responses at later periods of time, and the like.

In some embodiments, control circuitry 304 may determine, based on the type, an expected emotional response that the user will have when the user consumes the media content. For example, control circuitry 304 may, as described above, compare the type against entries of a database that corresponds type to expected emotional response. Control circuitry 304 may thereafter determine, of the plurality of biometric instruments, which biometric instruments are designed to provide measurements of the expected emotional response, for example, by comparing the expected emotional response against entries of a database that correspond biometric instrument capabilities to those capabilities' correlation to an expected emotional response.

Figure 6:
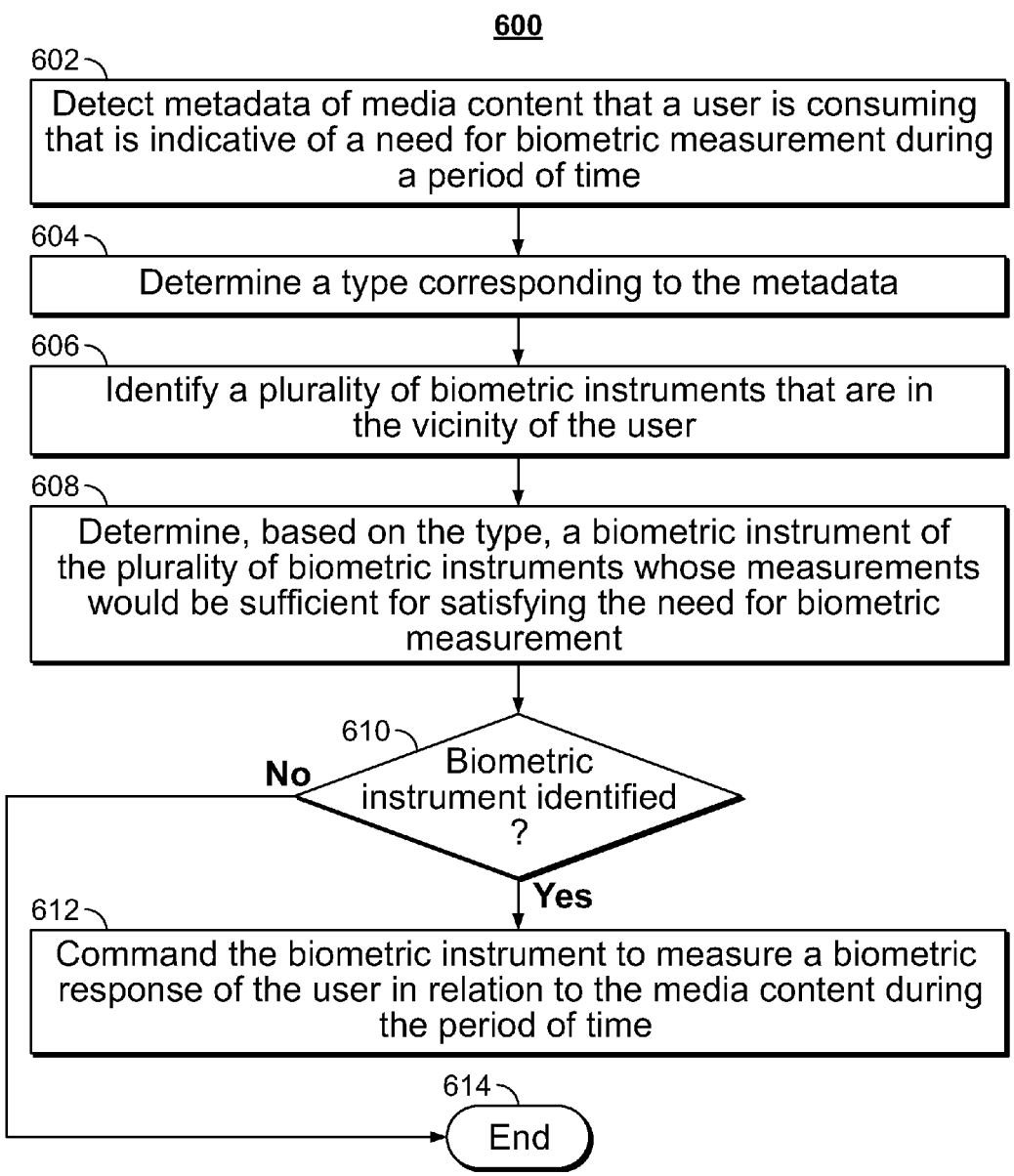
FIG. 6 is a flowchart of illustrative steps involved in selecting a biometric instrument to take measurements, whose biometric measurements would be relevant to a portion of viewed media content, in accordance with some embodiments of the disclosure.

FIG. 6 is a flowchart of illustrative steps involved in selecting a biometric instrument to take measurements, whose biometric measurements would be relevant to a portion of viewed media content, in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) in order to identify an appropriate biometric instrument. In addition, one or more steps of process 600 may be incorporated into or combined with one or more steps of any other process or embodiment.

Process 600 begins at 602, where control circuitry 304 may detect metadata of media content that a user is consuming that is indicative of a need for biometric measurement during a period of time. The period of time may correspond to any logical portion of media content. Examples of logical portions of media content include a scene, a period of time in which a given actor is present, a period of time in which characters are in a given location, a period of time in which a given item appears or in which a given service is being rendered, and any other logical portion of media content.

Metadata may be indicative of a need for biometric measurement during the period of time by indicating that the period of time is conducive to biometric measurement. In other words, the period of time may be associated with some portion of media content that is likely to be evocative of a biometric response by user 508. Control circuitry 304 may receive the metadata with the media content (e.g., by way of a VBI signal, or with the metadata embedded in the media content itself). Alternatively, control circuitry 304 may receive the metadata from another source, such as media content source 416 or media guidance data source 418, or from a third party provider such as a company that specializes in biometric analysis.

Control circuitry 304 may detect whether metadata is indicative of a need for biometric measurement in any number of ways. Control circuitry 304 may, for example, detect an express instruction within the metadata to take a biometric measurement during a specified period of time, and may conclude from this express instruction that there is a need for biometric measurement. The express instruction may not include a specified period of time, in which case the specified period of time can be used by comparing information of the express instruction to information of a database, such as media guidance data source 418. As an example, if control circuitry 304 understands an express instruction to detect a measure of user 508's laughter during a funny scene, control circuitry 304 may consult media guidance data source 418 to determine that the funny scene begins at time 43:51 and ends at time 47:20.

In some embodiments, control circuitry 304 may not detect any express instruction in the metadata, but may detect information that is nevertheless indicative of a need for biometric measurement during a period of time. As an example, control circuitry 304 may have access to a register of candidate metadata that, if detected, may be indicative of a need for biometric measurement. The register may be stored local to user equipment 502 (e.g., at storage 308) or remote to user equipment 502 (e.g., at media guidance data source 418). The candidate metadata may indicate that if an action scene is detected, a degree to which one is thrilled should be monitored, or if a funny scene is detected, an amount of laughter should be monitored. Accordingly, when control circuitry 304, for example, detects metadata indicative of an action scene, control circuitry 304 would learn that there is a need for biometric measurement indicative of how much one is thrilled. Control circuitry 304 may learn the duration of time, if not expressly stated within the detected metadata, through database comparison operations described above and below.

Process 600 may continue to 604, where control circuitry 304 may determine a type corresponding to the metadata. For example, control circuitry 304 may determine that the type is expressly stated in the metadata (e.g., "action scene"). As another example, control circuitry 304 may determine the type by consulting a candidate metadata register, such as one described above, to learn that an upcoming scene is an "action" type, or that an upcoming scene includes a particular actor, or any other type.

Process 600 may continue to 606, where control circuitry 304 may identify a plurality of biometric instruments 506 that are in the vicinity of the user. Control circuitry 304 may perform this identification in any of a variety of manners. As an example, control circuitry 304 may transmit a "HELLO" signal directed to devices on a local network (e.g., WiFi, Bluetooth, personal area network, local area network, etc.) to discover which devices control circuitry 304 is connected to. Control circuitry 304 may query any devices which respond for their capabilities, and may identify a plurality of those devices to be biometric instruments 506. As another example, control circuitry 304 may learn of biometric instruments 506 by virtue of them connecting to a network. For example, as biometric instruments 506 connect through a given access point, biometric instruments 506 may be identified on a register on a database (which may be stored on storage 306, media guidance data source 418, media content source 416, at the access point, or anywhere else that is accessible to user equipment 502). Control circuitry 304 may access such a register to determine which biometric instruments 506 are in the vicinity of the user.

Process 600 may continue to 608, where control circuitry 304 may determine, based on the type, a biometric instrument of the plurality of biometric instruments whose measurements would be sufficient for satisfying the need for biometric measurement. For example, control circuitry 304 may access a database (e.g., media guidance data source 418) that has entries linking what needs to be measured (e.g., how thrilled a person is, amount of laughter, etc.) to measurement units that correlate to what needs to be measured. For instance, how thrilled a person is may correspond to a person's heart rate or pulse rate, and so the database may have an entry linking "thrilled" to "heart rate." Control circuitry 304 may further access a database (which may be the same database or a different database) that has entries linking type (e.g., "action") to what needs to be measured (e.g., how thrilled one is). Finally, control circuitry 304 may access entries of yet another database that has entries linking biometric instruments' capabilities (e.g., heart rate monitoring, facial expression recognition, rate of breathing monitoring, etc.) to the biometric instruments' identities. Any of these database entries may be found on separate databases, or in one or more merged databases that comprise some or all of the above-described information. In sum, using comparison operations on these database(s) entries, control circuitry 304 may resolve an appropriate biometric instrument for taking biometric measurements.

Process 600 may continue to 610, where control circuitry 304 may determine whether a biometric instrument is identified. If no biometric instrument is detected, process 600 may continue to 614, where process 600 ends. If control circuitry 304 does detect a biometric instrument, process 600 may continue to 612, where control circuitry 304 may command the biometric instrument to measure a biometric response of the user in relation to the media content during the period of time. For example, control circuitry 304 may transmit a request (e.g., over communications network 414) to the identified biometric instrument. As an example, if control circuitry 304 has identified that a comedy scene of a movie is beginning at 43:21 and ending at 45:55, control circuitry 304 may transmit a command to a microphone to monitor vocal output of user 508 during that period of time, which control circuitry 304 may use to resolve an amount of laughter made by user 508.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
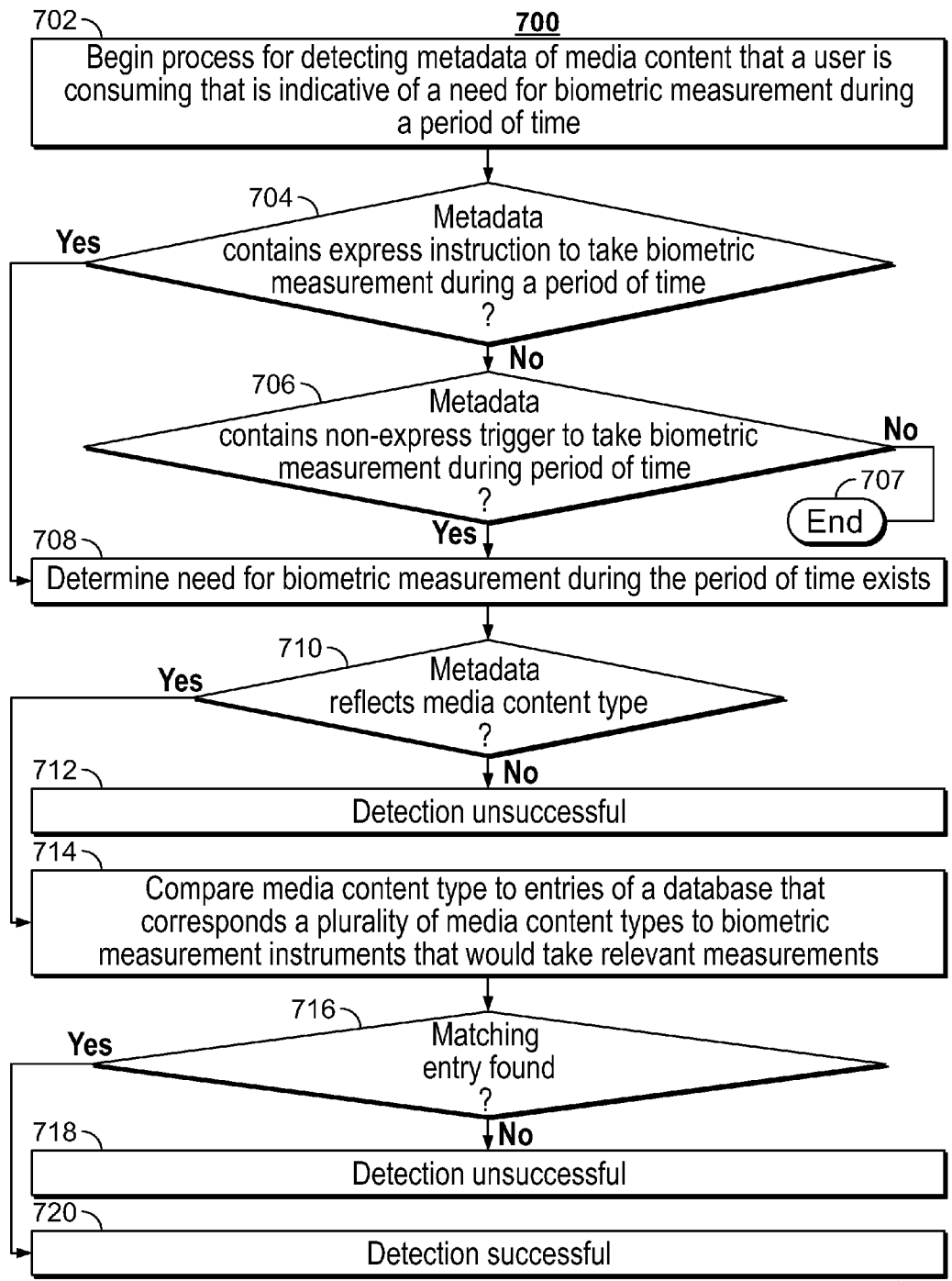
FIG. 7 is a flowchart of illustrative steps involved in detecting metadata that is indicative of a need for biometric measurement, in accordance with some embodiments of the disclosure.

FIG. 7 is a flowchart of illustrative steps involved in detecting metadata that is indicative of a need for biometric measurement, in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) to detect metadata indicative of a need for biometric measurement. In addition, one or more steps of process 700 may be incorporated into or combined with one or more steps of any other process or embodiment.

Process 700 begins at 702, where control circuitry 304 begins the process for detecting metadata of media content that a user is consuming that is indicative of a need for biometric measurement during a period of time. Control circuitry 304 may execute 702 when 602 of process 600 begins. Process 700 may continue to 704, where control circuitry 304 may determine whether metadata of the media content contains an express instruction to take a biometric measurement during a period of time. Manners in which control circuitry 304 may perform this determination discussed above and below are applicable here.

If, at 704, control circuitry 304 determines that there is no express instruction, process 700 may continue to 706, where control circuitry 304 may determine whether the metadata contains a non-express trigger to take a biometric measurement during the period of time. Systems and methods for performing this determination were discussed above and below. If control circuitry 304 determines that there is no non-express trigger in the metadata, process 700 may continue to 707, where the process ends.

If control circuitry 304 determines there to be either an express instruction (at 704) or a non-express trigger (at 706), process 700 may continue to 708, where control circuitry 304 may determine that a need for biometric measurement exists during the period of time. Systems and methods for performing this determination were discussed above and below and are equally applicable here.

Process 700 may then continue to 710, where control circuitry 304 may determine whether the metadata reflects the media content type. As described above and below, this reflection may be express or non-express, and the determination may be performed in any manner contemplated above and below. If control circuitry 304 is unable to determine whether the metadata reflects the media content type, process 700 may continue to 712 where control circuitry 304 may determine that a detection was unsuccessful. If, however, control circuitry 304 is able to determine that the metadata reflects the media content type, process 700 may continue to 714.

At 714, control circuitry 304 may compare the type of media content to entries of a database that corresponds a plurality of media content types to biometric instruments 506 that would take relevant measurements. Such a comparison operation is described above and below and is equally applicable here. Process 700 may then continue to 716, where control circuitry 304 may determine whether a matching entry was found in any manner described above and below. If control circuitry 304 did not find a matching entry, process 700 may continue to 718, where control circuitry 304 may conclude that the detection was unsuccessful. If, however, control circuitry 304 did find a matching entry, process 700 may continue to 720, where control circuitry 304 may conclude that the detection was successful, which may, e.g., cause process 600 to continue from 602 to 604.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

Figure 8:
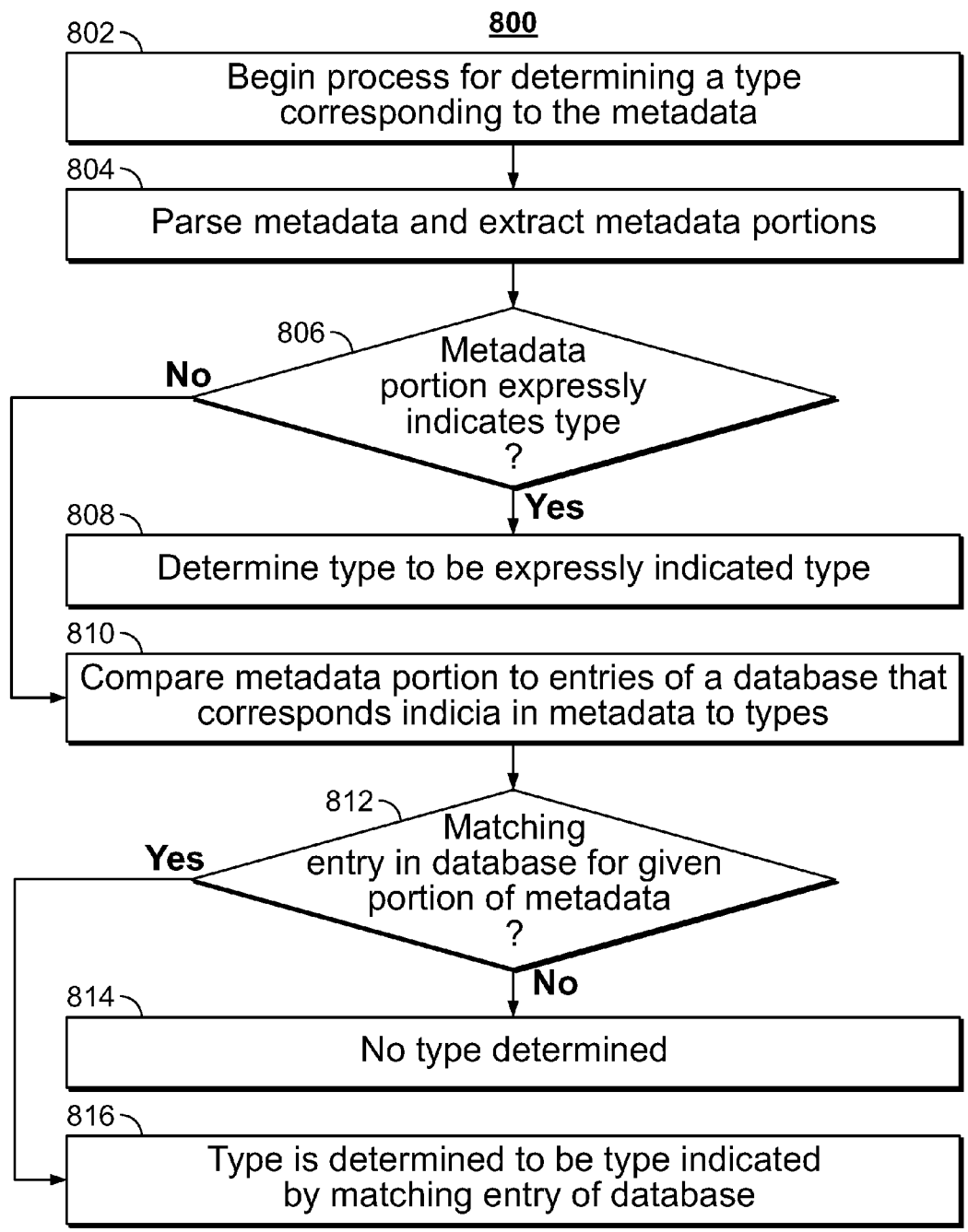
FIG. 8 is a flowchart of illustrative steps involved in determining a type corresponding to metadata associated with media content, in accordance with some embodiments of the disclosure.

FIG. 8 is a flowchart of illustrative steps involved in determining a type corresponding to metadata associated with media content, in accordance with some embodiments of the disclosure. It should be noted that process 800 or any step thereof could be performed on, or provided by, any of the devices shown in FIGS. 3-5. For example, process 800 may be executed by control circuitry 304 (FIG. 3) as instructed by control circuitry implemented on user equipment 402, 404, and/or 406 (FIG. 4) in order to determine a type corresponding to metadata. In addition, one or more steps of process 800 may be incorporated into or combined with one or more steps of any other process or embodiment.

Process 800 begins at 802, where control circuitry 304 may begin a process for determining a type corresponding to the metadata (e.g., in connection with executing 604 of process 600). Process 800 may continue to 804, where control circuitry 304 may parse the metadata to extract metadata portions, which may be performed in any manner described in greater detail above and below. Process 800 may then proceed to 806, where control circuitry 304 may determine whether the metadata expressly indicates a type. This determination may be performed in any manner discussed above and below. If control circuitry 304 determines that the metadata does expressly indicate a type, process 800 may continue to 808, where control circuitry 304 determines the type to be the expressly indicated type, and may, e.g., use this determination to conclude executing 604 of process 600 and proceed to 606 of process 600.

If control circuitry 304 determines that the metadata does not expressly indicate the type, then process 800 may continue to 810, where control circuitry 304 may compare the metadata portion to entries of a database that corresponds indicia in metadata to types in order to determine whether a database indicates that the metadata portion corresponds to a type. This may be performed in any manner described above or below in greater detail. Process 800 may then proceed to 812, where control circuitry 304 may determine whether there is a matching entry in the database for a given portion of metadata. If there is not a matching entry in the database, process 800 may continue to 814, where control circuitry 304 may conclude that no type has been determined. If there is a matching entry in the database, then process 800 may continue to 816, where control circuitry 304 may conclude that the type of the media content is determined to be the type indicated by the matching entry of the database. This determination may, e.g., conclude processing of 604 of process 600.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 8.

Figure 9:
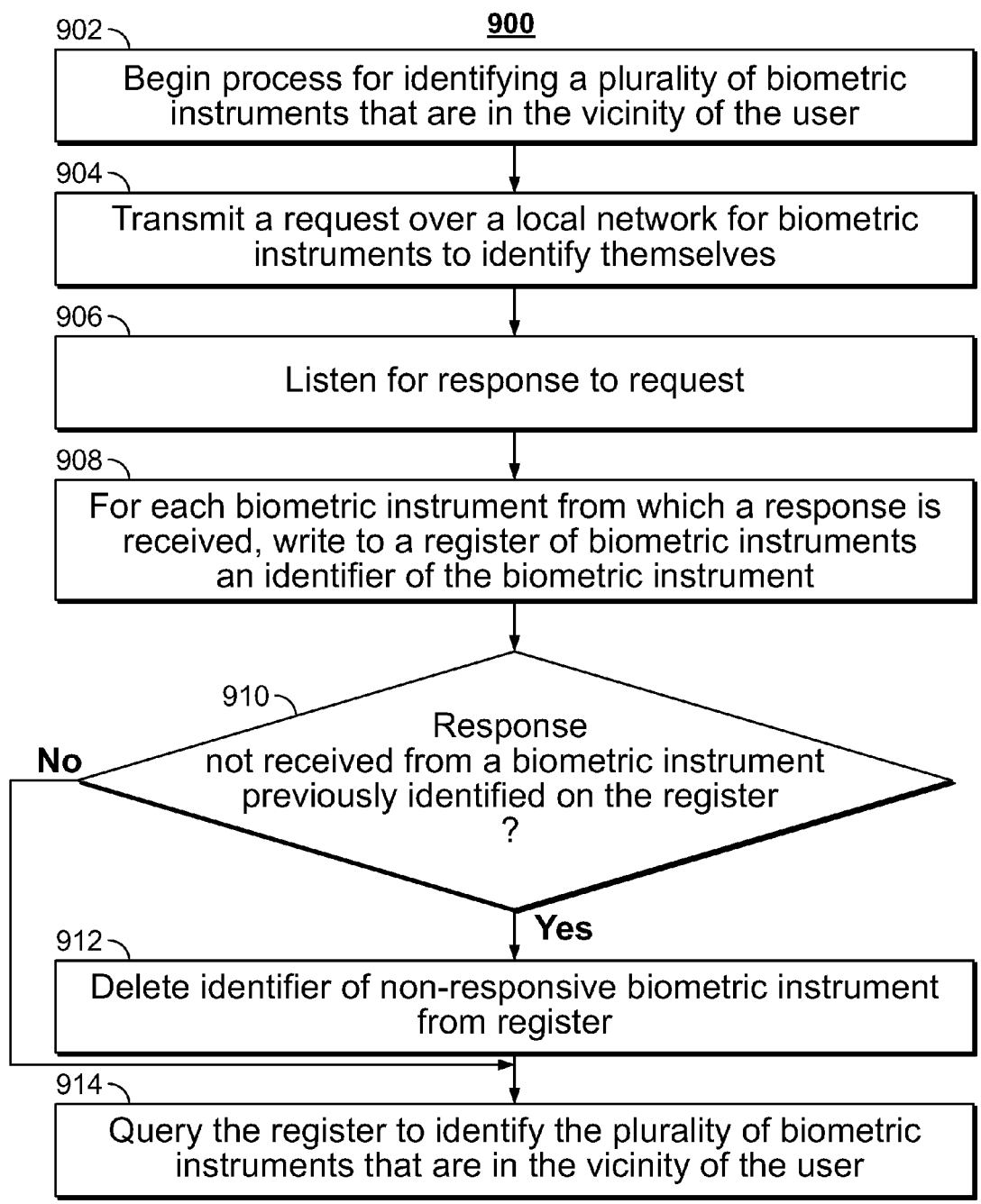
FIG. 9 is a flowchart of illustrative steps involved in identifying a plurality of biometric devices that are in a vicinity of a user, in accordance with some embodiments of the disclosure.

FIG. 9 is a flowchart of illustrative steps involved in identifying a plurality of biometric devices that are in a vicinity of a user, in accordance with some embodiments of the disclosure. It should be noted that process 900 or any step thereof could be performed on, or provided by, any of the devices shown in FIGS. 3-5. For example, process 900 may be executed by control circuitry 304 (FIG. 3) as instructed by control circuitry implemented on user equipment 402, 404, and/or 406 (FIG. 4) in order to identify a plurality of biometric instruments that are in a vicinity of a user. In addition, one or more steps of process 700 may be incorporated into or combined with one or more steps of any other process or embodiment.

Process 900 begins at 902, where control circuitry 304 may begin a process for identifying a plurality of biometric instruments that are in a vicinity of the user. Control circuitry 304 may execute Process 900, which begins at 902, e.g., in connection with executing 606 of process 600. Process 900 may continue to 904, where control circuitry 304 may transmit a request over a local network for biometric instruments to identify themselves, and, at 906, listen for a response to the request. Then, at 908, control circuitry 304 may, for each biometric instrument from which a response is received, write to a register of biometric instruments an identifier of the biometric instrument. Mechanisms for the execution of each of 902-908 are described above and below and equally applicable here.

Process 900 may end at 908, or, optionally, process 900 may proceed to 910, where control circuitry 304 may determine whether a response was not received from a biometric instrument previously identified on the register. The purpose of this is to determine whether a previously registered biometric instrument has been disconnected or removed from the network, so that control circuitry 304 does not attempt to transmit a command to a device that is no longer accessible. To this end, process 900 may continue to 912 if it is determined that a response was not received from a previously registered device, where control circuitry 304 may delete the identifier of the non-responsive biometric instrument from the register.

Process 900 may continue to 914 from 910 to query the register to identify the plurality of biometric instruments that are in the vicinity of the user. Control circuitry 304 may determine that any biometric instrument that is on the register is in the vicinity of user equipment 502. Moreover, items 904-912 of process 900 need not be executed at the time that 606 is executed. Rather, these items may be executed prior to 604 being executed such that at the time 604 is executed, only execution of 902 and 914 is necessary to identify the plurality of biometric instruments that are in the vicinity of the user.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 9.

Figure 10:
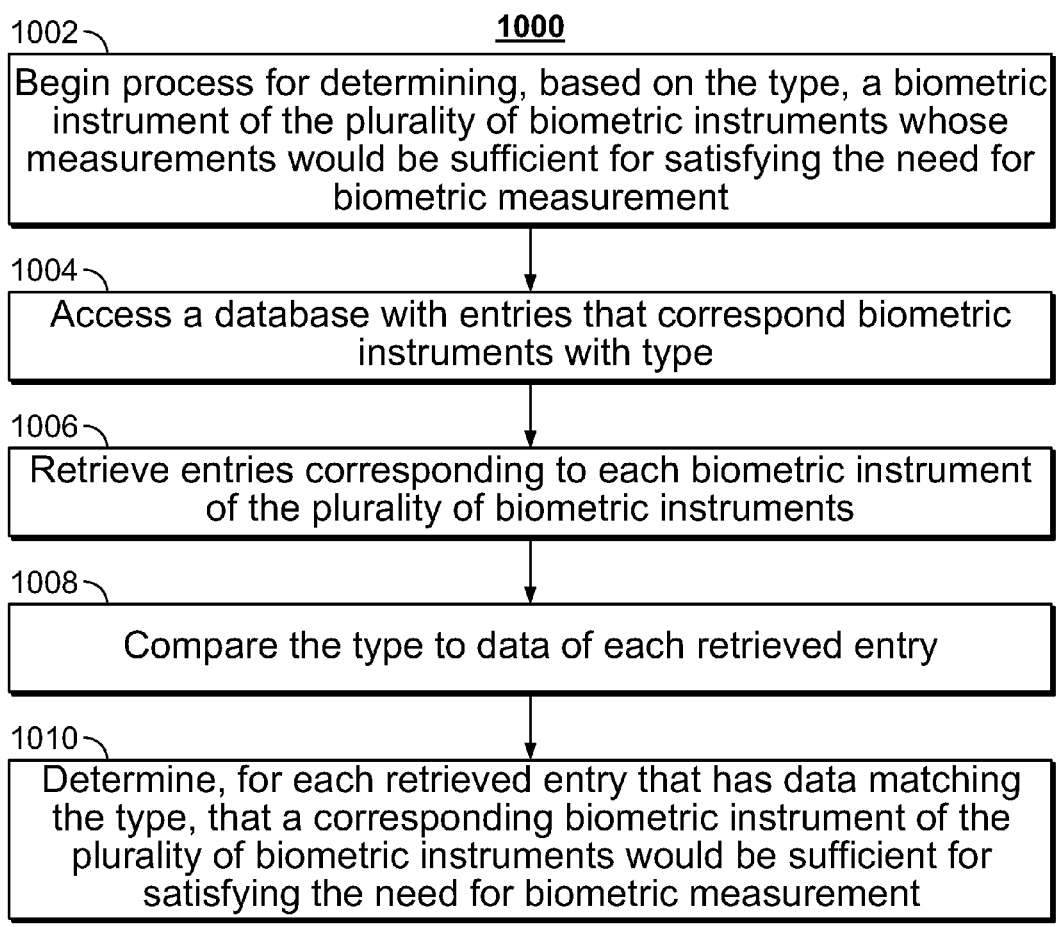
FIG. 10 is a flowchart of illustrative steps involved in determining a biometric instrument whose measurements would be sufficient to satisfy a need for biometric measurement, in accordance with some embodiments of the disclosure.

FIG. 10 is a flowchart of illustrative steps involved in determining a biometric instrument whose measurements would be sufficient to satisfy a need for biometric measurement, in accordance with some embodiments of the disclosure. It should be noted that process 1000 or any step thereof could be performed on, or provided by, any of the devices shown in FIGS. 3-5. For example, process 1000 may be executed by control circuitry 304 (FIG. 3) as instructed by control circuitry implemented on user equipment 402, 404, and/or 406 (FIG. 4) in order to determine a biometric instrument whose measurements would be sufficient for satisfying the need for biometric measurement. In addition, one or more steps of process 1000 may be incorporated into or combined with one or more steps of any other process or embodiment.

Process 1000 begins at 1002, where control circuitry 304 may (e.g., in connection with executing 608) begin a process for determining, based on the type, a biometric instrument of the plurality of biometric instruments whose measurements would be sufficient for satisfying the need for biometric measurement. Process 1000 may continue to 1004, where control circuitry 304 may access a database with entries that correspond biometric instruments with type. Accessing this database is described in detail above and below and equally applicable in connection with 1004.

Process 1000 continues to 1006, where control circuitry 304 may retrieve entries corresponding to each biometric instrument of the plurality of biometric instruments, then to 1008, where control circuitry 304 may compare the type of data of each retrieved entry, and finally to 1010, where control circuitry 304 may determine, for each retrieved entry that has data matching the type, that a corresponding biometric instrument of the plurality of biometric instruments would be sufficient for satisfying the need for biometric measurement. Each of the processes of 1006, 1008, and 1010 were described in detail above and below and those descriptions are applicable in each respective element of process 1000. Based on the determination of 1010, process 600 may resolve 608 and proceed to 610.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 10.

Figure 11:
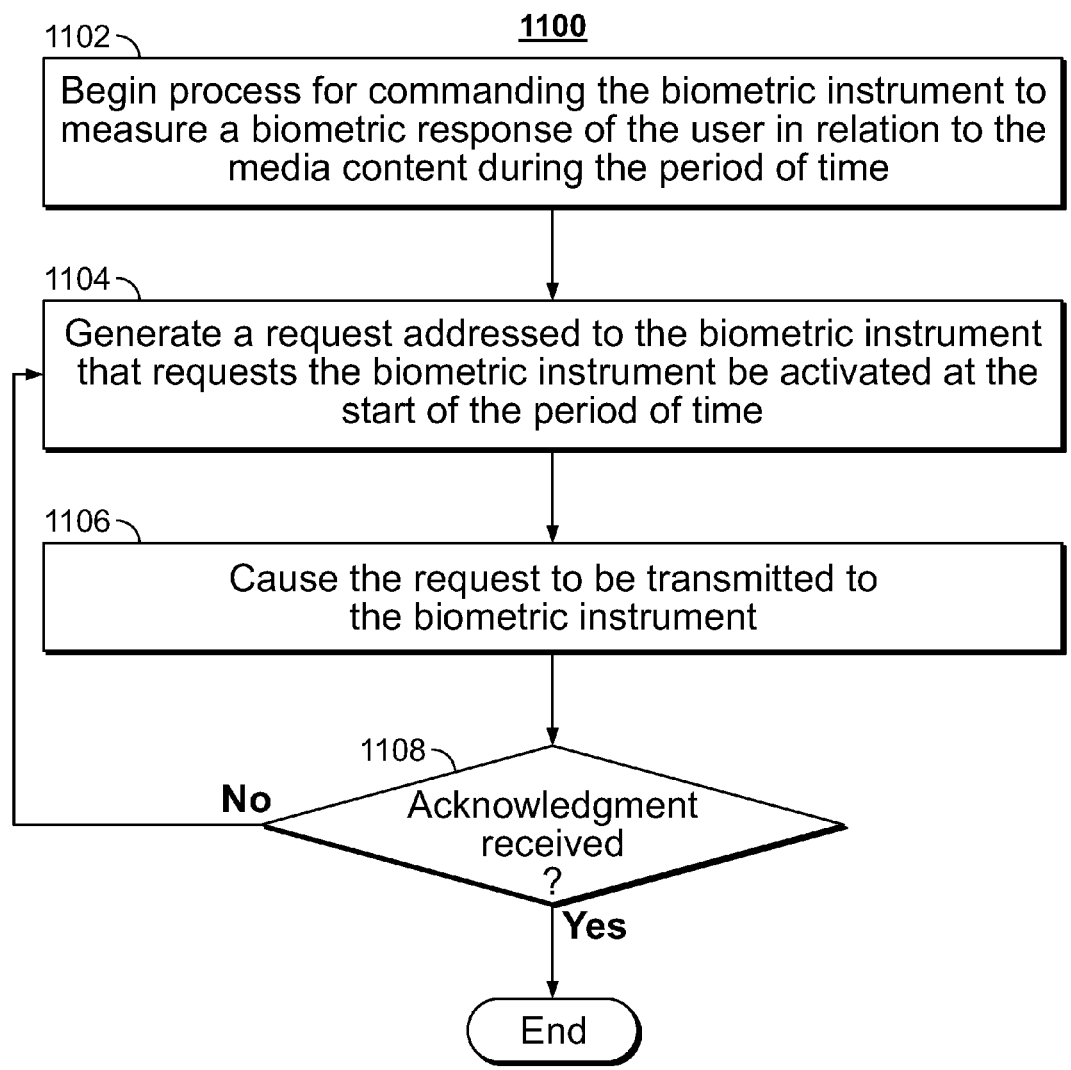
FIG. 11 is a flowchart of illustrative steps involved in commanding an appropriate biometric instrument to begin taking measurements that are relevant to a given media content, in accordance with some embodiments of the disclosure.

FIG. 11 is a flowchart of illustrative steps involved in commanding an appropriate biometric instrument to begin taking measurements that are relevant to a given media content, in accordance with some embodiments of the disclosure. It should be noted that process 1100 or any step thereof could be performed on, or provided by, any of the devices shown in FIGS. 3-5. For example, process 1100 may be executed by control circuitry 304 (FIG. 3) as instructed by control circuitry implemented on user equipment 402, 404, and/or 406 (FIG. 4) in order to command a biometric instrument to measure a biometric response of a user. In addition, one or more steps of process 1100 may be incorporated into or combined with one or more steps of any other process or embodiment.

Process 1100 begins at 1102, where control circuitry 304 may (e.g., in connection with 608 and/or 610) begin a process for commanding the biometric instrument to measure a biometric response of the user in relation to the media content during the period of time. Process 1100 may continue to 1104, where control circuitry 304 may generate a request addressed to the biometric instrument that requests the biometric instrument be activated at the start of the period of time. As an example, control circuitry 304 may command the biometric instrument to begin taking measurements at the start time of an action scene.

Process 1100 may continue to 1106, where control circuitry 304 causes the request to be transmitted to the biometric instrument (e.g., by way of communications network 414). At 1108, control circuitry 304 may determine whether an acknowledgment has been received from the biometric instrument. If an acknowledgment has been received, process 1100 concludes; otherwise, process 1100 may revert to 1104 and re-send the request until an acknowledgment is received.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, identification of an appropriate biometric instrument may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, an entry corresponding a type to a biometric measurement, as described herein, may be stored in, and retrieved from, storage 308 of FIG. 3, or media guidance data source 418 of FIG. 4. Furthermore, processing circuitry, or a computer program, may update settings associated with a user, such as a register of biometric devices in a vicinity of the user, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for selectively triggering biometric measurement from an appropriate biometric instrument of a plurality of biometric instruments to determine biometric responses that are relevant to presently consumed media content, the method comprising:
   detecting metadata of media content that a user is consuming that is indicative of a need for biometric measurement during a period of time;
   determining a type corresponding to the metadata;
   identifying a plurality of biometric instruments that are in the vicinity of the user;
   determining, based on the type, a biometric instrument of the plurality of biometric instruments whose measurements would be sufficient for satisfying the need for biometric measurement; and
   commanding the biometric instrument to measure a biometric response of the user in relation to the media content during the period of time.

2. The method of claim 1, further comprising:
   refraining from commanding biometric instruments of the plurality of biometric instruments that would not be sufficient for satisfying the need for biometric measurement to measure the biometric response of the user in relation to the media content during the period of time;
   identifying any biometric instruments of the plurality of biometric instruments that would not be sufficient for satisfying the need for biometric measurement that are measuring the biometric response of the user in relation to the media content during the period of time; and in response to the identifying of the any of the biometric instruments that would not be sufficient for satisfying the need for biometric measurement, commanding the any biometric instruments of the plurality of biometric instruments that would not be sufficient for satisfying the need for biometric measurement to cease measuring the biometric response of the user.

3. The method of claim 1, wherein detecting the metadata of the media content that the user is consuming that is indicative of the need for biometric measurement during the period of time further comprises:
receiving the metadata corresponding to the media content;
parsing the metadata for a trigger; and
when a trigger is found during the parsing, determining that the metadata is indicative of the need for biometric measurement.

4. The method of claim 3, further comprising determining, based on the trigger, an indication of both the type and the period of time, wherein the type varies both before and after the period of time, and wherein the period of time corresponds to a discrete portion of the media content.

5. The method of claim 1, further comprising commanding, at the end of the period of time, the biometric instrument to discontinue measuring the biometric response of the user.

6. The method of claim 1, wherein determining, based on the type, the biometric instrument of the plurality of biometric instruments whose measurements would be sufficient for satisfying the need for biometric measurement comprises:
determining, based on the type, an expected emotional response that the user will have when the user consumes the media content; and
determining, of the plurality of biometric instruments, which biometric instruments are designed to provide measurements of the expected emotional response.

7. The method of claim 6, wherein determining, based on the type, the expected emotional response comprises:
accessing a database;
identifying listings of the database that correspond to the type; and
determining, from data of the listings of the database that correspond to the type, the expected emotional response.

8. The method of claim 6, wherein determining, of the plurality of biometric instruments, which biometric instruments are designed to provide measurements of the expected emotional response, comprises:
accessing a database;
identifying listings of the database that correspond to each of the plurality of biometric instruments; and
determining, from data of the listings of the database that correspond to each of the plurality of biometric instruments, whether a given biometric instrument of the plurality of biometric instruments corresponds to a listing that reflects the expected emotional response.

9. The method of claim 1, further comprising determining that the metadata comprises an express instruction that there is the need for biometric measurement during the period of time.

10. The method of claim 1, further comprising determining the period of time by:
identifying the media content;
identifying a present elapsed time;
accessing a database;
comparing the present elapsed time to entries of the database;
determining, based on the comparison, a beginning and ending time of a scene corresponding to the present elapsed time; and
defining the period of time to be the period of time between the beginning time and the ending time.

11. A system for selectively triggering biometric measurement from an appropriate biometric instrument of a plurality of biometric instruments to determine biometric responses that are relevant to presently consumed media content, the system comprising:
communications circuitry; and
control circuitry configured to:
detect metadata of media content that a user is consuming that is indicative of a need for biometric measurement during a period of time;
determine a type corresponding to the metadata;
identify a plurality of biometric instruments that are in the vicinity of the user;
determine, based on the type, a biometric instrument of the plurality of biometric instruments whose measurements would be sufficient for satisfying the need for biometric measurement; and
command, using the communications circuitry, the biometric instrument to measure a biometric response of the user in relation to the media content during the period of time.

12. The system of claim 11, wherein the control circuitry is further configured to:
refrain from commanding biometric instruments of the plurality of biometric instruments that would not be sufficient for satisfying the need for biometric measurement to measure the biometric response of the user in relation to the media content during the period of time;
identify any biometric instruments of the plurality of biometric instruments that would not be sufficient for satisfying the need for biometric measurement that are measuring the biometric response of the user in relation to the media content during the period of time; and
in response to the identifying of the any of the biometric instruments that would not be sufficient for satisfying the need for biometric measurement, disable any identified biometric instruments.

13. The system of claim 11, wherein the control circuitry is further configured, when detecting the metadata of the media content that the user is consuming that is indicative of the need for biometric measurement during the period of time, to:
receive the metadata corresponding to the media content;
parse the metadata for a trigger; and
when a trigger is found during the parsing, determine that the metadata is indicative of the need for biometric measurement.

14. The system of claim 13, wherein the control circuitry is further configured to determine, based on the trigger, an indication of both the type and the period of time, wherein the type varies both before and after the period of time, and wherein the period of time corresponds to a discrete portion of the media content.

15. The system of claim 11, wherein the control circuitry is further configured to command, at the end of the period of time, the biometric instrument to discontinue measuring the biometric response of the user.

16. The system of claim 11, wherein the control circuitry is further configured, when determining, based on the type, the biometric instrument of the plurality of biometric instruments whose measurements would be sufficient for satisfying the need for biometric measurement, to:

determine, based on the type, an expected emotional response that the user will have when the user consumes the media content; and determine, of the plurality of biometric instruments, which biometric instruments are designed to provide measurements of the expected emotional response.

17. The system of claim 16, wherein the control circuitry is further configured, when determining, based on the type, the expected emotional response, to:
   access a database;
   identify listings of the database that correspond to the type; and
   determine, from data of the listings of the database that correspond to the type, the expected emotional response.

18. The system of claim 16, wherein the control circuitry is further configured, when determining, of the plurality of biometric instruments, which biometric instruments are designed to provide measurements of the expected emotional response, to:
   access a database;
   identify listings of the database that correspond to each of the plurality of biometric instruments; and
   determine, from data of the listings of the database that correspond to each of the plurality of biometric instruments, whether a given biometric instrument of the plurality of biometric instruments corresponds to a listing that reflects the expected emotional response.

19. The system of claim 11, wherein the control circuitry is further configured to determine that the metadata comprises an express instruction that there is the need for biometric measurement during the period of time.

20. The system of claim 11, wherein the control circuitry is further configured to determine the period of time by:
   identifying the media content;
   identifying a present elapsed time;
   accessing a database;
   comparing the present elapsed time to entries of the database;
   determining, based on the comparison, a beginning and ending time of a scene corresponding to the present elapsed time; and
   defining the period of time to be the period of time between the beginning time and the ending time.

* * * * *